United States Patent [19]
Irie et al.

[11] Patent Number: 5,723,154
[45] Date of Patent: Mar. 3, 1998

[54] TIRE MOLD TRANSPORTER

[75] Inventors: Nobuhiko Irie; Teruaki Muta, both of Nagasaki, Japan

[73] Assignee: Mitsubishi Jukogyo Kabushiki Kaisha, Tokyo, Japan

[21] Appl. No.: 558,802

[22] Filed: Nov. 15, 1995

[30] Foreign Application Priority Data

Nov. 18, 1994 [JP] Japan ................. 6-285237
Jul. 13, 1995 [JP] Japan ................. 7-177492

[51] Int. Cl.$^6$ ................................. B29C 35/00
[52] U.S. Cl. ................ 425/34.1; 425/28.1; 425/186; 425/195
[58] Field of Search ............... 425/28.1, 34.1, 425/38, 185, 186, 195

[56] References Cited

U.S. PATENT DOCUMENTS

| | | | |
|---|---|---|---|
| 3,932,079 | 1/1976 | Legostaev et al. | 425/34.1 |
| 4,444,039 | 4/1984 | Asari et al. | 72/342 |
| 4,472,127 | 9/1984 | Cyriax et al. | 425/183 |
| 4,728,274 | 3/1988 | Siegenthaler | 425/34.1 |
| 4,880,792 | 11/1989 | Yoshioka et al. | 425/190 |
| 4,946,358 | 8/1990 | Okuda et al. | 425/186 |
| 5,271,727 | 12/1993 | Irie | 425/38 |
| 5,419,694 | 5/1995 | Yonezawa et al. | 425/186 |
| 5,505,600 | 4/1996 | Ureshino et al. | 425/186 |
| 5,580,587 | 12/1996 | Leonhartsberger et al. | 425/186 |

FOREIGN PATENT DOCUMENTS

| | | |
|---|---|---|
| 1 579 292 | 7/1970 | Germany. |
| 44 34 406 | 3/1995 | Germany. |
| 60-159010 | 12/1985 | Japan. |
| 6-71651 | 3/1994 | Japan. |
| 6-99437 | 4/1994 | Japan. |
| 91/19580 | 12/1991 | WIPO. |

*Primary Examiner*—James P. Mackey
*Attorney, Agent, or Firm*—Wenderoth, Lind & Ponack

[57] ABSTRACT

A tire transporter which shuttles between a vulcanizing station 1 in which plural pairs of tire molds are arranged to perform vulcanization and a mold opening/closing station 2 in which the tire mold is opened and the vulcanized tire is taken out from the tire mold. Subsequently, an unvulcanized tire to be vulcanized is inserted into the tire mold and shaped before the tire mold is closed. The tire transporter includes a first railway 4 disposed along the vulcanizing station 1 and the mold opening/closing station 2. A truck is provided and moves along the first railway between a first position P1, set in the mold opening/closing station 2, and second positions P2, set at a plurality of portions in front of the vulcanizing station 1. A second railway 12 is disposed on the truck along a direction orthogonal to the first railway 4. A plurality of third railways 13 are disposed at the third positions P3, which are set at a plurality of portions in the vulcanizing station 1, along a direction orthogonal to the first railway 4. Also, a mold transfer unit 32 is provided and moves along the second and third railways 12 and 13 when one of the third railways 13 and the second railway 12 on the truck 19 are connected to each other.

17 Claims, 13 Drawing Sheets

TIRE MOLD TRANSPORTER

BACKGROUND OF THE INVENTION

1. Field of the Invention

The present invention relates to a tire mold transporter which is applied to a vulcanizer for a pneumatic tire to be installed in a vehicle or the like.

2. Description of the Related Art

A conventional tire vulcanizer introduces a heated and pressurized medium into the interior of a tire within a mold in a state where the mold is closed in order to perform a vulcanizing reaction. A period of time required for performing the take-in and shaping of an unvulcanized tire, as well as the take-out of a vulcanized tire, is remarkably shorter than a vulcanizing reaction time required for the above-mentioned process. This leads to a problem of reduced availability of a tire delivery unit and a unit for opening and closing a tire vulcanizing mold for taking the tire in or out of the mold. In order to solve the above problem, a tire vulcanizer consisting of a pair of mold opening/closing units and tire delivery units and a plurality of molds has been proposed (refer to Japanese Patent Application No. Hei 5-228961).

Vulcanizing stations 200 (200a and 200b) of the tire vulcanizer include a plurality of mold tables 204 (204a, 204b, 204c . . . . ) on which a plurality of tire molds M (Ma, Mb, Mc, . . . ) are mounted, as shown in FIGS. 9 and 10. Each of the mold tables 204 is equipped with mold moving means (for example, a cylinder-driven pusher) not shown, and as occasion demands, heated and pressurized medium supplement means, a piping or the like.

Mold opening/closing stations 201 (201a and 201b) include mold opening/closing units 205 (205a and 205b) which are similar to a known tire vulcanizer (a difference therebetween will be described later), known unloaders 206 (206a and 206b) which take out a vulcanized tire from the tire mold, and known loaders 207 (207a and 207b) which take an unvulcanized tire into the tire mold. As occasion demands, the mold opening/closing stations 201 are equipped with a vulcanized tire transportation conveyors 208 (208a and 208b), unvulcanized tire racks 209 (209a and 209b), or the like.

A mold transportation truck is comprised of rails 203 fixed to a floor, and known trucks 202 (202a and 202b) which are guided by the rails. 203 and travel by the operation of drive means not shown. A mold exchange station is comprised of a mold exchange table 210 which performs the exchange of a tread mold, a side wall mold or the like within the tire mold in accordance with a change in the specification of a tire to be vulcanized, the exchange of a bladder which is a consumable goods, and so on. The mold exchange table 210 is equipped with mold opening/closing means necessary for those exchange works.

In the above-mentioned tire vulcanizer, the tire vulcanizing mold M in which vulcanization has been finished is received from the vulcanizing station 200 by the mold transportation truck 202a, and then transported to the mold opening/closing station 201a.

After the tire vulcanizing mold which has been taken in the mold opening/closing station 201a is coupled to the mold opening/closing unit 205a, the tire vulcanizing mold M is opened with the operation of the mold opening/closing unit 205a, and the vulcanized tire is taken out by the unloader 206a attached to the above mold opening/closing unit 205a. An unvulcanized tire to be succeedingly vulcanized is taken in the tire vulcanizing mold M from which the vulcanized tire has been taken out by the loader 207a attached thereto. The shaping of the tire is conducted during a tire vulcanizing mold closing process, and after the tire vulcanizing mold has been closed, the heated and pressurized medium is introduced into the interior of the tire and charged therein, thus advancing to a tire vulcanizing process. Then, the coupling of the tire vulcanizing mold M in which the vulcanization starts to the mold opening/closing unit 205a is released, and the mold M is again transported by the mold transportation truck 202a so as to return to the vulcanizing station 200a.

A force that pushes and opens the tire mold through the heated and pressurized medium, which is introduced in the interior of the tire, is exerted on the tire vulcanizing mold during the tire vulcanization. The present applicant has already proposed a tire vulcanizing mold which is able to offset the force making the tire mold pushed and opened within the tire vulcanizing mold (refer to Japanese Patent Application No. Hei 6-122661).

That tire vulcanizing mold will be described with reference to FIGS. 11 to 13.

It should be noted that FIG. 13 shows a state in which the tire vulcanizing mold M has been closed after an unvulcanized tire T has been inserted into the tire vulcanizing mold M, and a heated and pressurized medium has then been introduced into the interior of the tire T through a bladder B to start vulcanization.

Reference numeral 101 denotes a substrate of the tire vulcanizing mold M, which is mounted on a frame 205e of the mold opening/closing unit 205a so as to be horizontally slidable thereon, and fixed to the frame 205e through a known lock unit (not shown).

Reference numeral 103 denotes a lower disc which is fixed onto the substrate 101 through a hard heat-insulating material 102 (in this example, a heated and pressurized medium passage is provided and serves as a heating plate, but a conventional known heating plate independent from the lower disc 103 may be attached to the lower side of the lower disc 103); 105, a lower side wall mold which is fixed onto the lower disc 103; 106, a lower bead ring having an outer peripheral surface which is engaged with the inner cylindrical surface of the lower side wall mold 105, which is detachably assembled in a flange 120a formed in the central outer periphery of the cylindrical body 120 by means of a clamper 108. The lower portion of the bladder B is nipped between the bladder presser 107 which is fastened on the lower bead ring 106 by bolts and the lower bead ring 106.

The above-mentioned cylindrical body 120 may be fixedly provided on the substrate 101 as shown, or it may be fixedly provided on the lower disc 103 or an independent heating plate which is disposed at the lower side of the lower disc 103.

Reference numeral 109 denotes a tread mold which is divided into a plurality of pieces in the peripheral direction. The tread mold 109 is fastened by bolts onto the inner peripheral surface of segments 110 the outer peripheral surface of which forms a practical conical surface when the tread mold 409 is closed. The segments 110 are slidable on a pressure plate 104 fixed onto a flange 103b which is formed on the outer peripheral portion of the lower disc 103.

Reference numeral 111 denotes an outer ring having in the periphery thereof a conical surface which is engaged with the outer peripheral surface of the segments 110. A T-bar 111a, which is slidably engaged with a T-groove 110a formed vertically in the conical outer peripheral surface of the segments 110, is fixed onto the conical inner peripheral surface of the outer ring 111. A slide guide 115 which is assembled in a plurality of arms 114a extending from the outer peripheral portion of the upper disc 114 in a radial direction thereof so as to be slidable in the radial direction is fixed onto the upper surface of the segment 110. When the upper disc 114 and the outer ring 111 go up and down relatively in the axial direction, the tread mold 109 is moved in the radial direction through the segments 110 so as to be expanded and reduced. When the tread mold 109 is closed, claws 110b and 110c formed on the upper and lower end portions of the segments 110 are engaged with claws 114b and 103b formed in the outer peripheral portions of the upper disc 114 and the lower disc 103. When the tread mold is opened, the engagements of the claws 110b and 114b, the claws 110c and 103a are released.

Reference numeral 113 denotes an upper side wall fastened onto the upper disc 114 (in this example, it also serves as a heating plate with the provision of a heated and pressurized medium passage, but, a known heating plate which is independent from the upper disc 114 may be attached onto the upper side of the upper disc 114), and 116 is an upper bead ring fastened onto the upper side wall 113 by bolts.

Reference numeral 121 denotes a center post which is inserted into the foregoing cylindrical body 120 so as to go up and down (be slidable); and 122, a bush which is integrally attached onto the lower end portion of the center post 121 and has an outer peripheral surface slid on the inner peripheral surface of the cylindrical body 120. Reference numeral 123 denotes a packing which is inserted into the upper end of the cylindrical body 120 and has an inner peripheral surface slid on the center post 121; and 124, a stopper for the packing 123. An automatic coupling means, which is assembled into the top of the rod of the center post elevation cylinder (not shown), is pressed and inserted into a concave portion 121a formed in the lower end portion of the center post 121. A cap 125 is fixed onto the upper end portion of the center post 121 through a pin 126.

Reference numeral 118 denotes a flange which is fastened onto the cap 125 by bolts, and 117 is a bladder presser which is fastened onto the flange 118 by bolts. The upper end of the bladder B is nipped between the outer peripheral portion of the flange 118 and the bladder presser 117. Both ends of the bladder B are away from or approach each other in accordance with the actuation of the foregoing center post elevation cylinder.

It should be noted that a nozzle ring 127 having a plurality of nozzles 127a which introduce a heated and pressurized medium into the interior of the tire T through the bladder B is fixed onto the above-mentioned cylindrical body 120. The cylindrical body 120 is formed with a heated and pressurized medium passage 120c and a heated and pressurized medium exhaust passage 120d which communicate with the nozzle 127a. Quick couplers 128 and 129 with a check valve, which connect those passages 120c and 120d to an external piping of the mold unit, are assembled in the outlet portions of those passages 120c and 120d.

Reference numeral 130 denotes a cover plate the outer peripheral portion of which is fastened on the outer ring 111 through a spacer ring 112 and a hard heat-insulating material 131 by bolts. Reference numeral 132 denotes a spacer which is fixed onto the upper disc 114, and 119a, 119b and 119c are soft heat insulating materials.

A locking means for the upper disc 114 and the cover plate 130 is comprised of an inner ring 138 fastened onto the upper disc 114 by bolts, an outer ring 134 rotatably assembled in the inner. periphery of the cover plate 130 through the bush 133, plural pairs of claws 134a and 138a which are formed in the inner periphery of the outer ring 134 and the outer periphery of the inner ring 138 and are engageable or can pass in the axial direction thereof in accordance with a rotating angle of the outer ring 134, and a swinging unit which will be described later.

It should be noted that reference numeral 136 denotes a stopper fixed to the outer ring 134.

Reference numeral 140 shown in FIGS. 11 and 12 denotes a bolster plate fixed onto an arm 205c which is assembled in a column of the mold opening/closing unit 205a, and moves up and down by the operation of the elevation cylinder 205d.

Reference numeral 141 denotes a known detachably attaching unit which detachably attaches the bolster plate 140 to the cover plate 130; 135, a pusher fixed onto the bolster plate 140; 142, a plurality of rods the respective ends of which are fixed onto the bolster plate 140; 143, a mold opening/closing cylinder fastened to the other ends of the rods 142 by bolts; 144, an extension rod fixed onto the top of a rod 143a of the mold opening/closing cylinder 143; 146, a sleeve assembled in the extension rod 144 so as to be rotatable (slidable); and 145, a bush screwed to the inside of the upper end of the sleeve 146.

The coupling means for coupling the above mold opening/closing cylinder 143 to the above upper disc 114 is comprised of the extension rod 144, the bush 145, the sleeve 146, a coupling rod 139 which is integrally attached to the inner ring 138, and plural pairs of claws 139a and 146a which are formed in the outer peripheral upper portion of the coupling rod 139 and the inner peripheral lower portion of the sleeve 146 so as to be engageable or passible in the axial direction thereof in accordance with a rotating angle of the sleeve 146.

Reference numeral 148 denotes a lever a top of which is fork-shaped. The lever 148 is rotatably attached to the bolster plate 140 through a pin 149. A cylinder 150 is fitted between the other end of the lever 148 and the bolster plate 140 so that the lever 148 swings about the center of the pin 149 by the actuation of the cylinder 150.

Reference numeral 147 denotes a rod fixed onto the arm 146c extending outward from the sleeve 146. The rod 147 is in parallel to the sleeve 146. The rod 147 is inserted into a U-shaped groove which is formed in the top fork portion of the above lever 148, and the top of the arm 137 is inserted into a key groove 146a which is formed in the outer periphery of the sleeve 146 in parallel to the axis. The above arm 137 is fixed onto the outer ring 134, and the operation of the cylinder 150 allows the lever 148 to swing so that the sleeve 146 rotates. The outer ring 134 is also rotated through the sleeve 146 and the arm 137. The rotation, when the paired claws 134a and 138a are in an engagement state, enables the paired claws 139a and 146b to pass (a release state), and when the paired claws 134a and 138a are in a passable state (a release state), makes the paired claws 139a and 146b in the engagement state.

Also, the above-mentioned pusher 135, in the state where the detachably attaching unit 141 of the bolster plate 140 and the cover plate 130 are abutted against each other, pushes down the inner peripheral portion of the cover plate 130 so as to be elastically deformed until coming in contact with the spacer 132 which is fixed onto the above-mentioned upper disc 114, to thereby regulate the deformation amount.

Then, when the outer ring 134 is rotated, a gap is defined in the heightwise directions of the claw 134a on the inner peripheral portion of the outer ring 134 and the claw 138a on the outer peripheral portion of the inner ring 138 so as to be readily rotated. On the other hand, after the above-mentioned claws 134a and 138a are engaged with each other by rotating, the above-mentioned bolster plate 140 is allowed to go up, and when the claws 134a and 138a are abutted against each other, most of the deformation amount of the lower portion of the above-mentioned cover plate 130 remains. The above-mentioned cover plate 130 operates as a spring body so that the relative movement of the outer ring 111, the segments 110 and the upper disc 114 are offset internally.

In other words, an internal force in the interior of the tire produces a force in the radial direction of the tread mold 109 and the segment 110, and this force is converted into an upward force on an inclined surface of the outer ring 111. The elastic deformation force of the above-mentioned cover plate, which is directed downward, obstructs the motion that the outer ring 111 tends to move upwardly with respect to the segments 110.

Subsequently, a description will be given in more detail of the operation of the tire vulcanizer shown in FIGS. 9 to 12 and the tire vulcanizing split mold unit shown in FIG. 13.

FIGS. 12 and 13 show a state in which the vulcanization of the tire within the tire vulcanizing mold Ma, which has been mounted on the mold table 204a of the vulcanizing station 200a, has been finished, and the mold Ma has been then taken in the mold opening/closing unit 205a of the mold opening/closing station 201a by means of a mold transportation truck 202a.

In this situation, the paired claws 134a and 138a are in the engagement state, and the paired claws 139a and 146b are in the passible state.

From this state, the cylinder 205d is first actuated to move the arm 205c down, and the detachably attaching unit 141 allows the cover plate 130 and the bolster plate 140 to be coupled to each other (refer to FIG. 11). Also, A pusher 135 makes the cover plate 130 deformed downwardly, to thereby define a gap between the engagement surfaces of the claws 134a and 138a. Also, the heated and pressurized medium passages 120c and 120d are connected to a piping (not shown) external to the mold through the quick couplers 128 and 129.

Subsequently, a changeover valve (not shown) is actuated in such a manner that the heated and pressurized medium is exhausted from the interior of the tire T, and after it has been confirmed that a pressure within the tire T was sufficiently lowered, the cylinder 150 is actuated so that the paired claws 139a and 146b are engaged with each other and the upper disc 114 and the rod 143a of the cylinder 143 are coupled to each other. Also, the paired claws 134a and 138a are made in the passible state, to thereby release the lock.

Thereafter, as has been well known, the cylinder 143 is actuated in a direction toward which the upper disc 114 is pushed down, and the cylinder 205d is actuated in a direction toward which the bolster plate 140 goes up. With such operation, the tread mold 109 is peeled off from the tire T, and the diameter of the tread mold 109 is expanded. Also, the engagement of the claw 110b with the claw 114b and the engagement of the claw 103a with the claw 110c are released, respectively, and the bolster plate 140 further goes up. When the cylinder 143 reaches the stroke end, the upper disc 114 is lifted up because the claw 139a is engaged with the claw 146b, to thereby open the tire vulcanizing mold.

Subsequently, the vulcanized tire T is taken out to the outside of the tire vulcanizing mold, and a tire to be succeedingly vulcanized is taken into the tire vulcanizing mold. Then, the cylinder 205d is then actuated in a backward direction before the tire vulcanizing mold is closed. With such operation, the segment 110 hung from the upper disc 114 first abuts against the pressure plate 104, and thereafter while the cylinder 143 is moved back, the outer cylinder 110 goes down through the bolster plate 140 so that the tread mold 109 is reduced in diameter. Thus, the tire vulcanizing mold is closed, and further the pusher 135 deforms the cover plate 130 downward.

During that operation, a pressure gas for shaping is introduced into the interior of the tire T, and the claws 110b and 103a are then engaged with the claws 114b and 110c, correspondingly, at a final stage where the diameter of the tread mold 109 is reduced.

After the tire vulcanizing mold has been closed in this manner, the actuation of the cylinder 143 is stopped, and the cylinder 150 is actuated in the backward direction so that the paired claws 134a and 138a are engaged with each other, and the cover plate 130 and the upper disc 114 are locked together. Simultaneously, the paired claws 139a and 146b are made in the passible state, and the bolster plate 140 is lifted up so that the above-mentioned claws 134a and 138a are engaged with each other. Subsequently, the heated and pressurized medium is introduced into the interior of the tire before advancing to a vulcanizing process.

In this situation, a force which is exerted so as to make the side wall molds 105 and 113 away from each other due to a pressure of the heated and pressurized medium is offset within the mold unit through the upper disc 114, the claws 114b, 110b, the segment 110, the claws 110c, 103a, and the lower disc 103. A force which is exerted in the radial direction so as to enlarge the diameter of the tread mold 109 is offset within the outer ring 111 through the segment 110. Simultaneously, a vertical component of the radial directional force which is caused by a slide inclined surface interposed between the segment 110 and the outer ring 111, that is, a force which is exerted so as to make the outer ring 111 float is offset within the mold unit through the spacer ring 112, the hard heat-insulating material 131, the cover plate 130 and the elastic return force thereof, the outer ring 134, the claws 134a, 138a, the inner ring 138, the upper disc 114, and the claws 114b and 110b.

Hence, it is needless to hold the mold unit by an external force through the bolster plate 140. The detachably attaching unit 141 is released, and the cylinder 205d is actuated so that the arm 205c is allowed to go up before the mold unit is moved at a predetermined position of the vulcanizing station in the procedure reverse to the above-mentioned procedure. Then, the vulcanization is continued.

In the tire vulcanizer shown in FIGS. 9 to 12, it is necessary that the tire mold which is a weight substance is selectively, effectively and safely transported between the vulcanizing station in which plural sets of tire molds are arranged to perform vulcanization and the mold opening/closing station in which the tire mold is opened and the vulcanized tire is taken out from the tire mold, and subsequently an unvulcanized tire to be vulcanized is inserted into the the tire mold and shaped before the tire mold is closed.

Also, there is no problem in the case where the respective structural units of the tire vulcanizer operate satisfactorily. However, if the mold transfer unit experiences a failure, during a subsequent repair operation, not only the tire mold which is being transported, but also tire molds, other than in group to which the failed mold transfer unit belongs and which are being transported, cannot perform the work of extracting the vulcanized tire, resulting in reduced productivity.

SUMMARY OF THE INVENTION

The present invention has been made in view of the above-mentioned problem, and therefore an object of the present invention is to provide a tire mold transporter which is capable of (1) selectively, effectively and safely transporting a tire mold which is a weight substance between a vulcanizing station and a mold opening/closing station, (2) stopping the lowering of the productivity when a mold opening/closing unit, etc. fails to the required minimum, and (3) reducing the costs as well as the generation rate of failures.

The above-mentioned objects of the present invention have been achieved by the provision of a tire transporter which shuttles between a vulcanizing station in which plural sets of tire molds are arranged to perform vulcanization and a mold opening/closing station in which the tire mold is opened and the vulcanized tire is taken out from the tire mold. Subsequently, an unvulcanized tire to be vulcanized is inserted into the tire mold and shaped, and then the tire mold is closed. The tire transporter comprises a first railway disposed along the vulcanizing station and the mold opening/closing station. A truck is provided with a drive unit which moves along the first railway between a first position set in the mold opening/closing station and second positions set at a plurality of portions in front of the vulcanizing station. A second railway is disposed on the truck along a direction, which is orthogonal to the first railway. A plurality of third railways are disposed on the third positions, which are set at a plurality of portions in the vulcanizing station, along a direction orthogonal to the first railway. Also, a mold transfer unit is provided and is movable along those second and third railways when one of the third railways and the second railway on the truck are connected to each other.

In the above-mentioned tire mold transporter, the third railways may be disposed at the respective fourth positions symmetrical with the respective third positions of the vulcanizing station with respect to the first railway along a direction orthogonal to the first railway. Also, the mold transfer unit may move along those second and third railways when one of the third railways and the second railway on the truck are connected to each other.

In the above-mentioned tire mold transporter, the second railway on the truck and the mold transfer unit may be rotatable by 180° on a horizontal plane.

In the above-mentioned tire mold transporter, when the truck is at the first position, a tire mold on the truck may be elevated to float from the second railway and also the truck may be elevated to float from the first railway.

In the above-mentioned tire mold transporter, the tire mold transfer unit may be equipped with a slider which is movable on a fourth railway and a beam which is movable on the slider along a fifth railway in the direction of said second railway. A block is provided so as to be movable on the beam along a sixth railway in a direction of the second railway. Also provided are a chain wheel, which is rotatably attached to both ends of the beam, and a chain which is meshed with the chain wheel and has appropriate portions coupled to the block and the slider.

In the above-mentioned tire mold transporter, the first, second and third railways may be comprised of a weight receiving exclusive rails and direction guide exclusive railways, respectively, and the direction guide exclusive railways may be so disposed as to pass the center point of the tire mold.

In the above-mentioned tire mold transporter, there may be provided a truck on which the tire mold is mounted and which moves on a floor surface having no railway, and a transportation car which moves that truck while being coupled to that truck.

In the above-mentioned tire mold transporter, an air slider may be disposed on the lower surface of the truck so that the truck is allowed to float by blowing air from a gap between the air slider and the floor surface.

DETAILED DESCRIPTION OF THE PREFERRED EMBODIMENTS (First Embodiment)

Now, a description will be given of a tire mold transporter in accordance with one embodiment of the present invention with reference to FIGS. 1 to 4.

Figure 1:
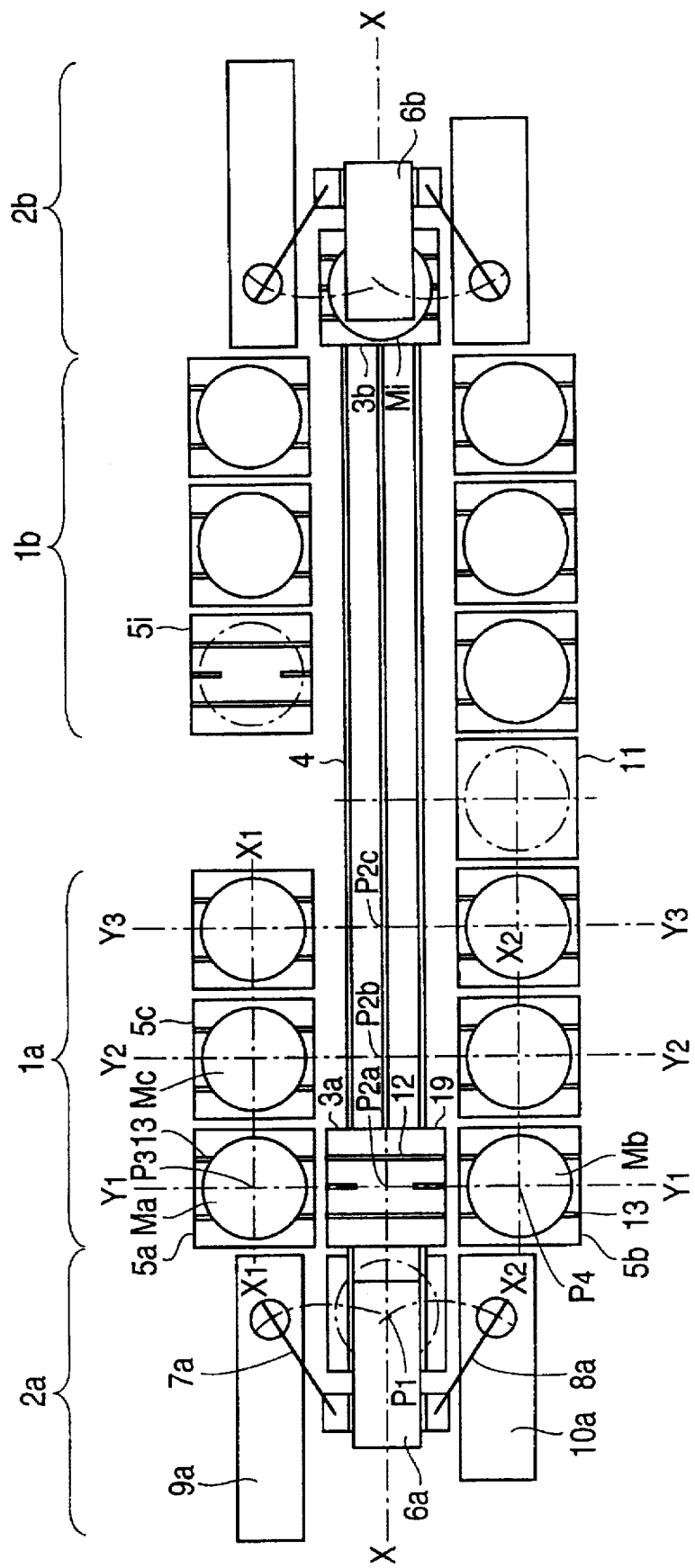
FIG. 1 is a plan view showing a tire mold transporter in accordance with a first embodiment of the present invention.

First, the whole tire vulcanizer will be described with reference to FIG. 1.

Vulcanizing stations 1 (1a and 1b) are comprised of a plurality of mold tables 5 (5a, 5b, 5c, . . . ) on which a plurality of tire molds M (Ma, Mb, Mc, . . . ) are mounted, although they will be described later, and each of the mold tables 5 is equipped, as the occasion demands, with heated and pressurized medium supplement means, a piping or the like.

Mold opening/closing stations 2 (2a and 2b) are comprised of mold opening/closing units 6 (6a and 6b) as in a known tire vulcanizer, a known unloader 7a which takes out a vulcanized tire from the tire mold, and a known loader 8a which inserts an unvulcanized tire into the tire mold. As the occasion demands, the mold opening/closing stations 2 are equipped with a vulcanized tire carrier conveyor 9a, an unvulcanized tire rack 10a or the like.

The tire mold transporter is comprised of a first railway 4 which is fixed onto a common base and truck units 3 (3a and 3b) which are each guided by the first railway 4 and travels by a drive unit not shown.

A mold exchange station includes a mold exchange table 11 which performs the exchange of a tread mold, a side wall mold or the like within the tire mold, which accompanies the change in the specification of the vulcanized tire, the exchange of a bladder which is a consumable good, and so on. The mold exchange station has a mold opening/closing means which is necessary for those exchange works. It should be noted that, as the occasion demands, a tire vulcanizing mold preheating chamber may be provided. Also, the mold exchange table 11 may be formed merely by a table on which the tire vulcanizing mold is temporarily mounted, or by the tire vulcanizing mold preheating chamber so that the tire vulcanizing mold is transported to another place by a forklift or the like to perform the exchange of parts within the mold.

Figure 2:
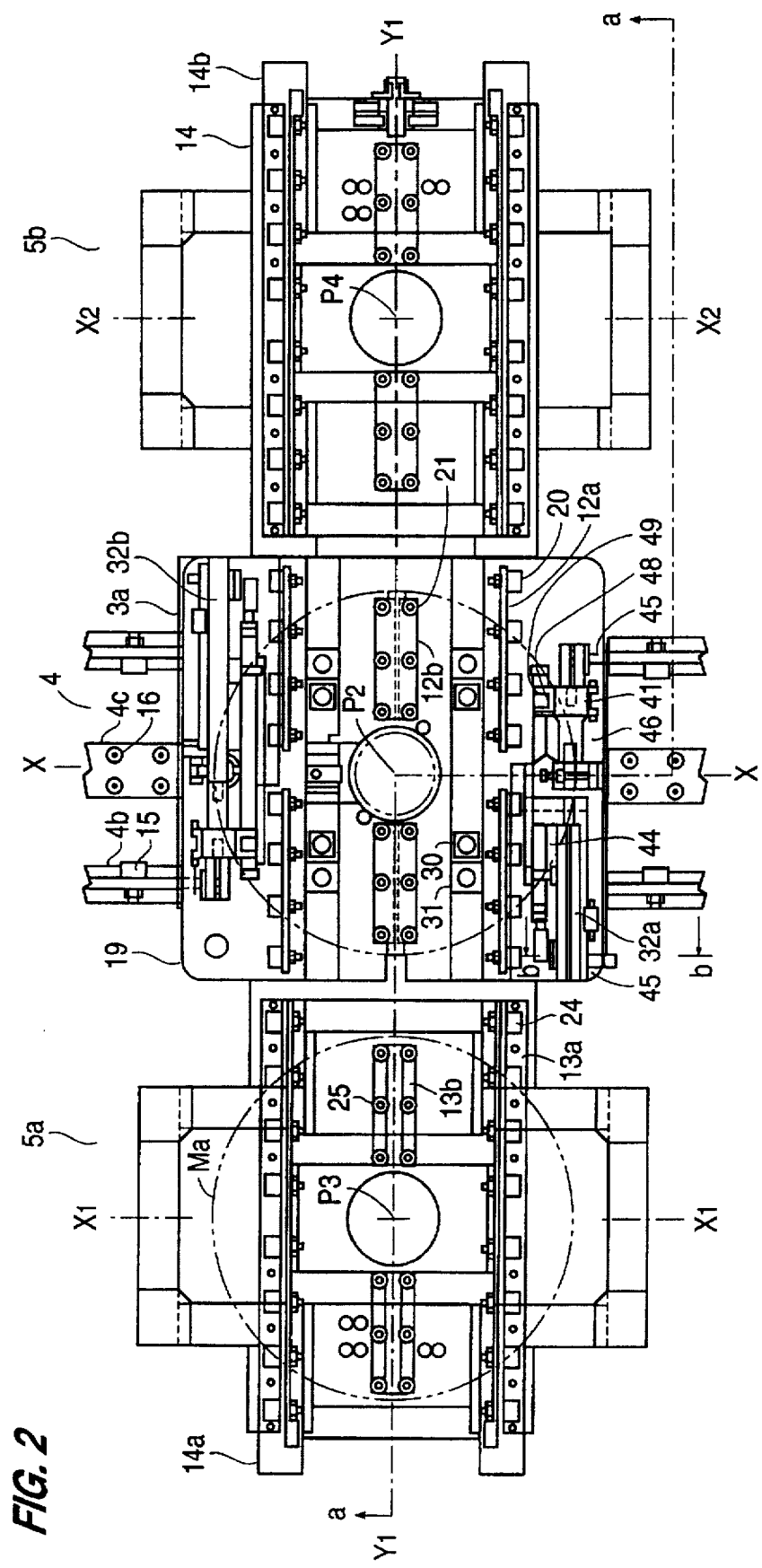
FIG. 2 is a plan view showing an enlarged portion indicated by a line Y1—Y1 in FIG. 1.
Figure 3:
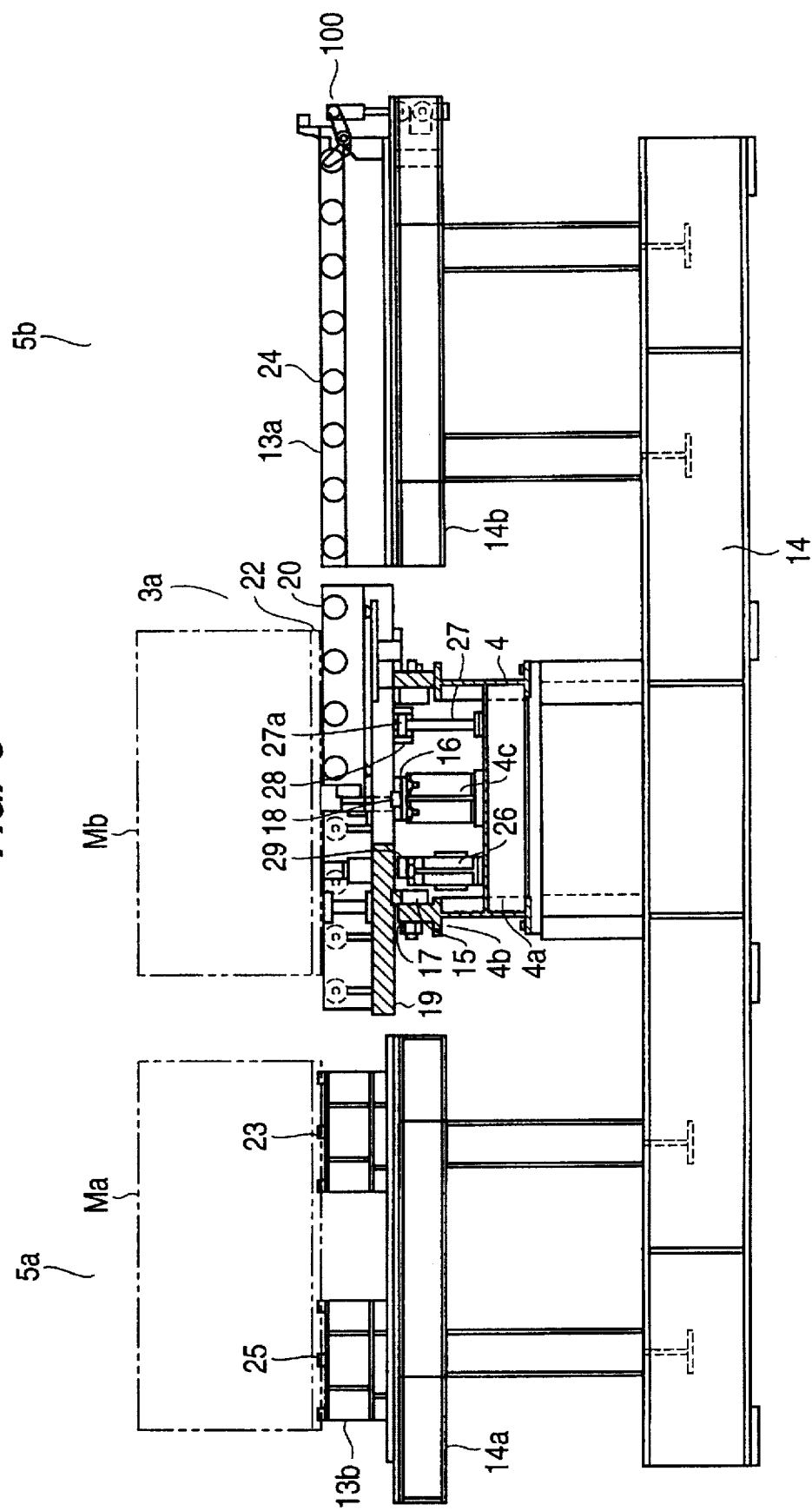
FIG. 3 is a vertical cross-sectional side view showing the tire mold transporter taken along a line a—a in FIG. 2.
Figure 4:
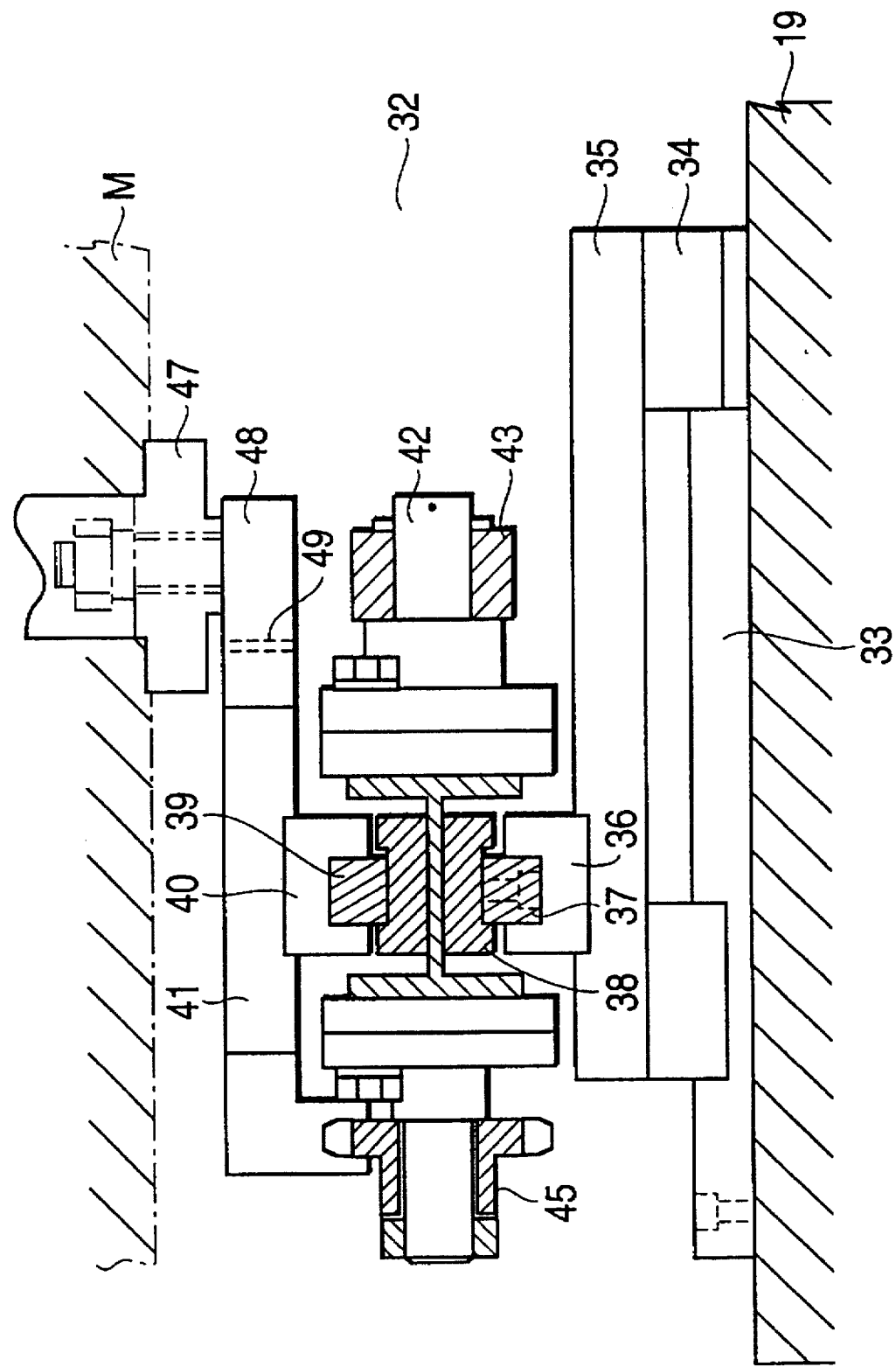
FIG. 4 is a vertical cross-sectional front view showing the tire mold transporter taken along a line b—b in FIG. 2.

Subsequently, a description will be provided in more detail of the tire mold transporter with reference to FIGS. 2 to 4.

Taking the increase/decrease of the mold tables 5 within the vulcanizing station 1 into consideration, a common base 14 is divided into a plurality of pieces in this embodiment. FIG. 2 shows a common base 14 for the mold tables 5a and 5b, which is one of the plurality of pieces. Tables 14a and 14b for the mold tables 5a and 5b are integrally disposed on both ends of the common base 14.

A plurality of first railways 4 are fixed along a center line X—X which is orthogonal to a center line $Y_1$—$Y_1$ of the common base 14, and extends over the common base 14. Weight receiving exclusive railways 4b are disposed on both sides of the frame 4a of the first railway 4, and a guide exclusive railway 4c is disposed in the center of the frame 4a thereof.

Rollers 15 are assembled in the weight receiving exclusive railway 4b so that each line of the rollers 15 is aligned horizontally to form roller lines. Rails 17 are fitted onto the back surface of the truck 19 in such a manner that the rails 17 are mounted on the line of the rollers 15.

Two lines of rollers 16 are vertically assembled in the above-mentioned guide exclusive railway 4c to form roller lines. A key 18 is fitted onto the back surface of the truck 19, and inserted between the two lines of the rollers 16.

The truck 19 is guided by the lines of the rollers 16 so as to be moved on the lines of the rollers 15 by means of a drive unit not shown. It should be noted that a relationship in arrangement between the respective roller lines and the rails or key can be reversed.

Second railways 12, which consist of a pair of right and left load bearing or weight receiving exclusive railways 12a in which respective horizontal attaching rollers 20 are assembled in a line and a guide exclusive railway 12b in which vertical attaching rollers 21 are assembled in two lines in the center of the railways 12a, are assembled in the upper surface of the truck 19 in a direction which is orthogonal to the first railway 4. Rails 22 fitted onto the back surface of each tire mold M is mounted on the railways 12a, and a key 23 fitted on the back surface of the tire mold M is inserted between the roller lines of the railway 12b.

Third railways 13, which consist of a pair of weight receiving exclusive railways 13a in which rollers 24 are aligned in one line as in the second railway 12 in an extending direction of the above-mentioned second railway 12 and a guide exclusive railway 13b in which rollers 25 are aligned in two lines, are assembled on the tables 14a and 14b for the mold tables 5a and 5b. The tire mold M is designed so as to move along the railways 12 and 13 between the truck unit 3a and the mold table 5a or 5b by means of the tire mold transfer unit 32 which will be described later in more detail.

As in the first railway 4, the second or third railways make it possible to reverse a relationship between the roller and the rail or the key, or to apply the slide system.

When the truck unit 3a, on which the tire mold M is mounted enters the mold opening/closing unit 6a and conducts an opening/closing operation of the mold M, for the purposes of positioning the mold M with respect to the mold opening/closing unit 6a and of preventing the shaping reaction or the like during the opening/closing operation of the mold M from directly effecting the above-mentioned first and second railways 4 and 12, a plurality of hydraulic cylinders 26 are assembled in the insertion portion within the mold opening/closing unit 6 of the frame 4a of the first railway 4, and also the lower portions of a plurality of positioning rods 27 are fixed.

When the truck unit 3a comes to a first position P1 (refer to FIG. 1), a block 28 having a concave recess into which a flange 27a formed on the top portion of the rod 27 can intrude is fixed on the lower surface of the truck 19. Similarly, when the hydraulic cylinder 26 makes the truck 19 float through a block 29 which is fitted on the lower surface of the truck 19, the concave recess of the above-mentioned block 28 is engaged with the top flange 27a of the positioning rods 27 so as to conduct the positioning of the floating truck 19.

Likewise, a plurality of hydraulic cylinders 30, a plurality of positioning rods 31 and a plurality of blocks are assembled in the upper surface of the truck 19 and the back surface of each tire mold M so as to conduct the floating and positioning of the tire mold M.

A mold transfer unit 32a which transfers the tire mold M onto the truck unit 3a or the mold table 5a therebetween and a mold transfer unit 32b which transfers the tire mold M onto the truck unit 3a or the mold table 5b therebetween are disposed on the upper surface of the truck 19.

In the mold transfer units 32 (32a and 32b), a slider 35 is fixed onto a direct acting bearing 34 which slides with a guide member of a fourth railway 33 which is fixed on the upper surface of the truck 19 in a direction orthogonal to the above-mentioned second railways 12a and 12b. The slider 35 slides in a direction orthogonal to the second railways 12a and 12b by means of a slider drive unit (not shown), and a fifth railway 37, which is slidable in parallel to the second railways 12a and 12b with a guide member of the direct acting bearing 36 that is fitted on the slider 35, is fixed on the beam 32. A rod end fitting 43 of a hydraulic cylinder 44 which is assembled in the slider 35 is coupled to the above-mentioned beam 38 through a pin block 42, and the beam 38 slides in parallel to the second railway 12 by means of the hydraulic cylinder 44.

Chain wheels 45 are rotatably assembled in both ends of the beam 38, and a chain 46 extends around each of the chain wheels 45, and an appropriate portion of the lower side of the chain 46 is assembled in the slider 35. A sixth railway 39 is fixed on the beam 38 in parallel to the fifth railway 37, and a mold drive end block 41 is fixed on the direct acting bearing 40 which slides with a guide member of the sixth railway 39. An appropriate portion of the upper side of the above-mentioned chain 46 is assembled in the mold drive end block 41, and the above-mentioned hydraulic cylinder 44 makes the above-mentioned mold drive end block 41 slide in the same direction as that of the beam 38.

Hence, the mold drive end block 41 moves with a stroke twice as long as that of the beam 38. In the mold drive end block 41, a cam 48 is rotatably assembled in the back surface of the tire mold M through a block 47, and a U-shaped concave portion 49 which is engaged with the cam 48, is formed in the mold drive end block 41. When the concave portion 49 of the mold drive end block 41 and the cam 48 are in the direction $Y_1-Y_1$ (direction of the second or third railway), if the slider 35 moves toward the center side of the truck 19, the concave portion 49 and the cam 48 are engaged with each other in such a manner that the tire mold M and the transfer unit 32 are coupled to each other. If the slider 35 moves in an opposite direction, the coupling of the tire mold M to the transfer unit 32 is then released.

Subsequently, a description will be given in more detail of the operation of the above-mentioned tire mold transporter (the first embodiment) shown in FIGS. 1 to 5.

It is assumed that the vulcanization of a tire has been nearly finished within the tire mold Ma on the mold table 5a. Then, an empty truck unit 3a is moved to a position P2a in front of the tire mold Ma, and the slider 35 of the mold transfer unit 32a (the mold transfer unit 32b if the vulcanization of the tire mold Mb is finished) is moved in a direction away from the center of the truck 19.

After the vulcanization in that tire mold Ma has been finished, the hydraulic cylinder 44 is actuated in such a manner that the mold drive end block 41 is moved below the tire mold Ma. Thereafter, the slider 35 is reversed so that the tire mold Ma and the transfer unit 32a are coupled to each other.

After the coupling of the tire mold Ma to the transfer unit 32a has finished, the above-mentioned hydraulic cylinder 44 is actuated in the reverse direction in such a manner that the tire mold Ma is transferred to a center P2a of the truck unit 3a before the truck unit 3a on which the tire mold Ma is mounted is moved to an opening/closing position P1 of the mold opening/closing unit 6a.

After the truck unit 3a reaches the mold opening/closing position P1 and stops there, the hydraulic cylinders 26 and 30 are actuated so that the truck 19 floats from or is lifted off of the first railways 4a and 4b, and the tire mold Ma floats from or is lifted off of the second railways 12a and 12b. As a result, the positioning rods 27, 31 and the truck 19 position the tire mold Ma at the mold opening/closing unit 6a.

Then, the vulcanized tire is taken out from the tire mold Ma in a known procedure, and then an unvulcanized tire is inserted into the tire mold Ma and shaped. When the tire mold M is closed, a heated and pressurized medium for vulcanization is introduced into the interior of the tire before advancing to a succeeding vulcanizing process.

The tire mold, thus proceeding to the vulcanizing process, is transported to a predetermined position within the vulcanizing station in a procedure reverse to the above-mentioned procedure, and the vulcanizing process is continued. The truck unit 3a moves for the purpose of transporting a tire mold in which the vulcanizing process is to be succeedingly finished.

It should be noted that in the case of conducting the exchange of the molds, the exchange of the bladders or the like, the tire mold is closed once without an unvulcanized tire being inserted into the mold, and the truck unit 3a transfers the tire mold to the mold exchange station or table 11. After the exchange of the molds or the like is conducted, the tire mold is transferred to the mold opening/closing station to conduct the operation of taking an unvulcanized tire to be succeedingly vulcanized in the tire mold, or the like.

(Second Embodiment)

Figure 5:
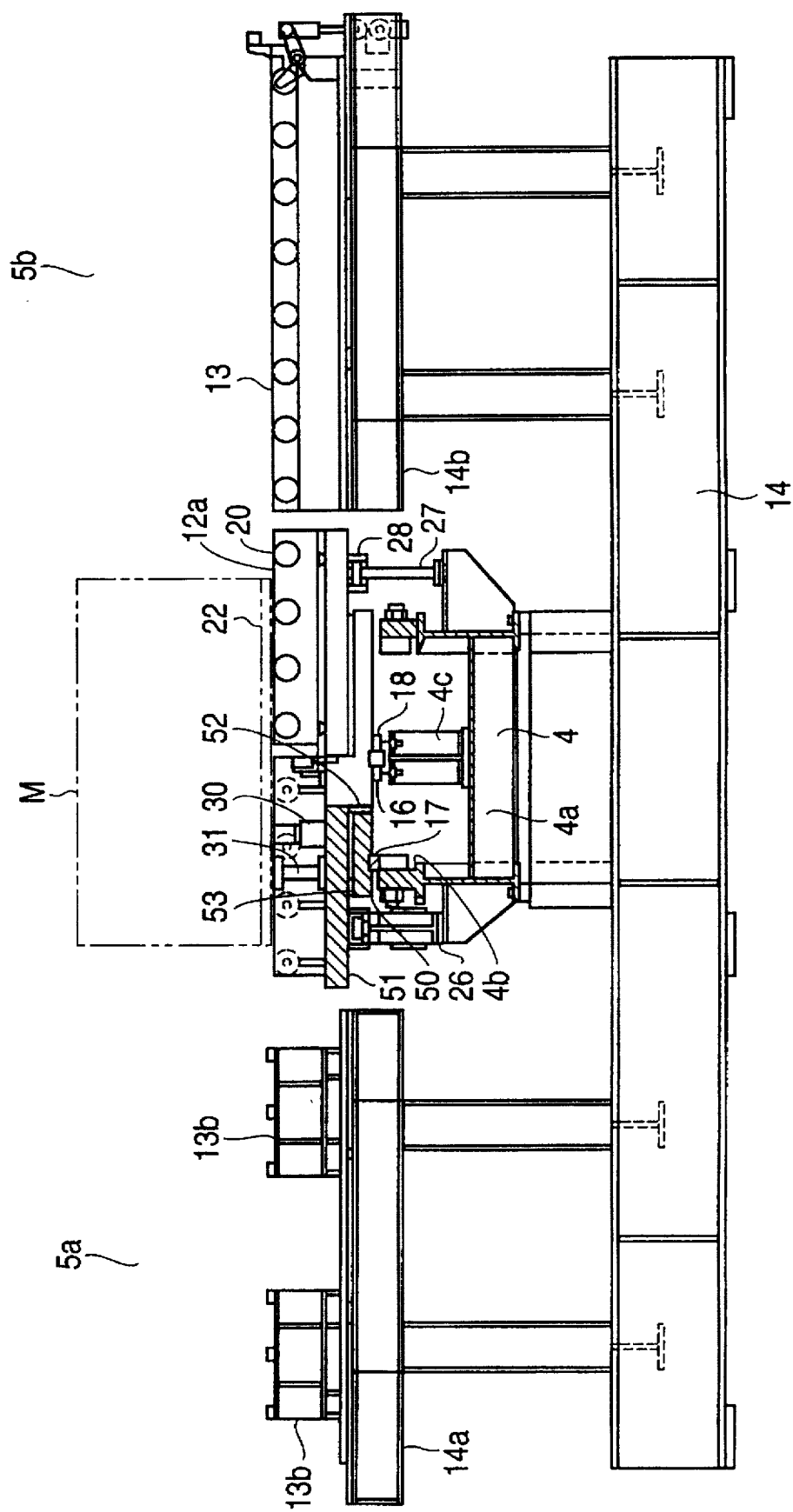
FIG. 5 is a plan view showing a tire mold transporter in accordance with a second embodiment of the present invention.

Subsequently, a description will be given of a tire mold transporter in accordance with a second embodiment of the present invention with reference to FIG. 5.

The second embodiment is different from the above-mentioned first embodiment as follows: (1) The structure of the truck of the truck unit 3 is different between the first and second embodiments, as will be described later. (2) The tire mold transporter in accordance with the first embodiment is equipped with two pairs of mold transfer units 32 (32a, 32b), however, the tire mold transporter in accordance with the second embodiment is equipped with only one pair of mold transfer units. (3) Only the attachment positions of the cylinder 26 for floating the truck and the positioning rod 27 are changed between the first and second embodiments.

Hence, the parts corresponding to those in the first embodiment are designated by the same symbols and their description will be omitted here. Only different portions will be described.

In this embodiment, a member corresponding to the truck 19 in the first embodiment is comprised of a truck 50 having a lower surface on which a rail 17 and a key 18 are fixed, and a turn table 51 which is assembled in the truck 50 through a turning bearing 52 and a plane bush 53 so that it can turn in a horizontal plane. As in the first embodiment, the second railway 12, the mold transfer units 32 (as was described above, a pair of mold transfer units 32) and so on are disposed on the upper surface of the turn table 51, and a drive unit not shown enables the truck 50 to move on the first railway 4 in the direction X—X in FIG. 1. Also, a drive unit not shown enables the turn table 51 to turn by 90° in such a manner that the second railway 12 is in the clockwise and counterclockwise with respect to the first railway 4, that is, in the direction of the third railway 13.

Also, the truck floating cylinder 26 and the positioning rod 27, which are assembled in the frame 4a of the first railway 4, are so constituted as to make the turn table 51 directly float when positioned within the mold opening/closing unit.

With such a structure, for example, in the transfer of the tire mold M with respect to the mold table 5a, the turn table 51 is held in a state where it is turned clockwise by 90°. Also, in the transfer of the tire mold M with respect to the mold table 5b, the turn table 51 is held in a state where it is turned centerclockwise by 90°. Hence, the mold transfer unit 32 maybe equipped with any one of the mold transfer units 32a and 32b of the first embodiment.

It should be noted that the turning of the turn table 51 may be conducted when it is placed in front of each mold table or while the truck unit 3a is being moved on the first railway 4. Also, when the truck unit 3a reaches the home position P1 within the mold opening/closing unit 6a, whether the second railway 12 on the turn table 51 is set in parallel to the first railway 4 or at right angles to the first railway 4 may be selected taking the arrangement of the mold table and the mold exchange table 11 within the vulcanizing station 1a (in the case where many of them are disposed at one side, the second railway 12 is set at right angles to the first railway 4 with advantage) into consideration. It should be noted that a fixing unit 100 including a stopper which fixes a replaced mold assembly to a predetermined position in the vulcanizing station 5b is installed in each vulcanizing station, but since it is well known, its detailed description will be omitted.

(Third Embodiment)

Figure 6:
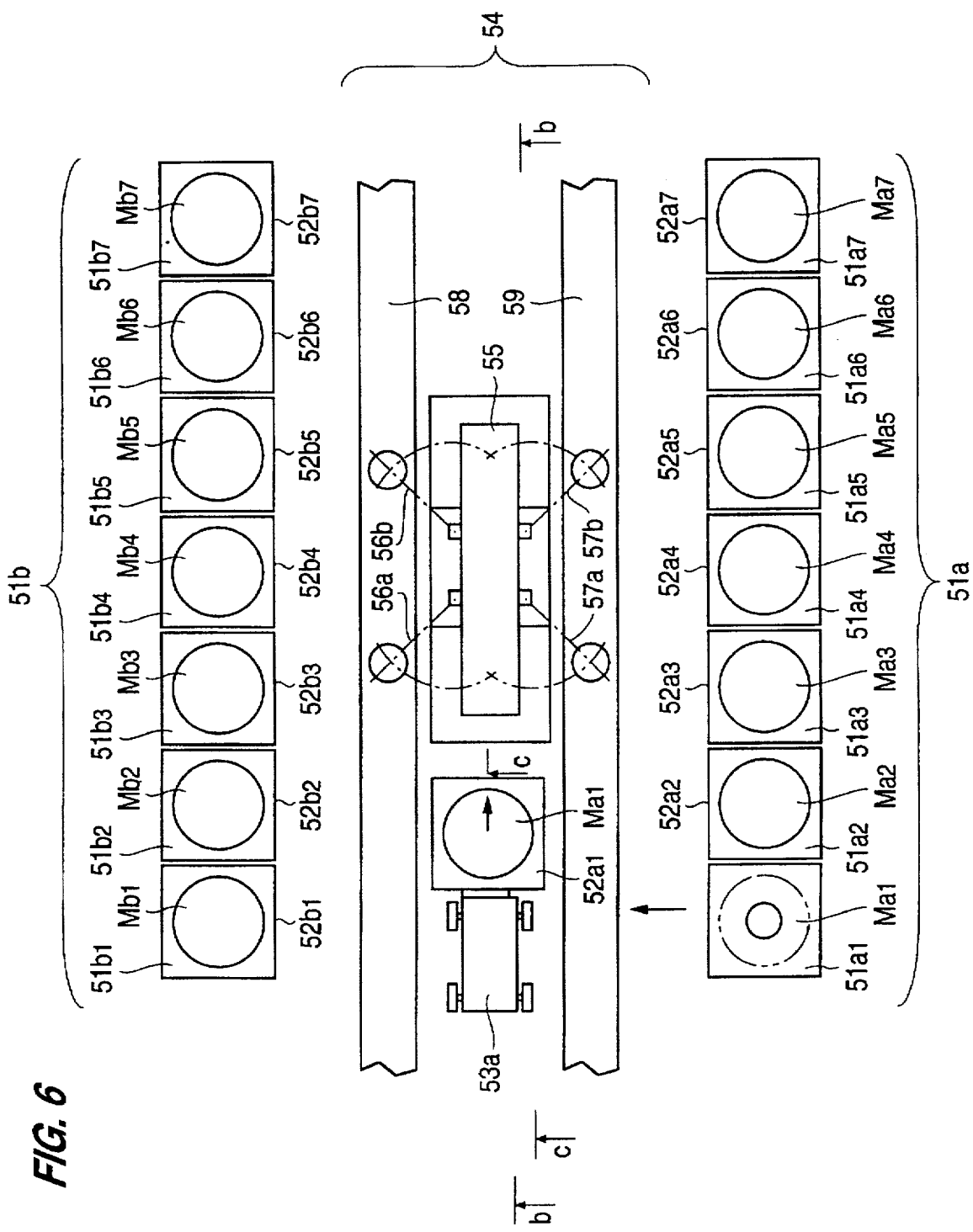
FIG. 6 is a plan view showing a tire mold transporter in accordance with a third embodiment of the present invention.
Figure 7:
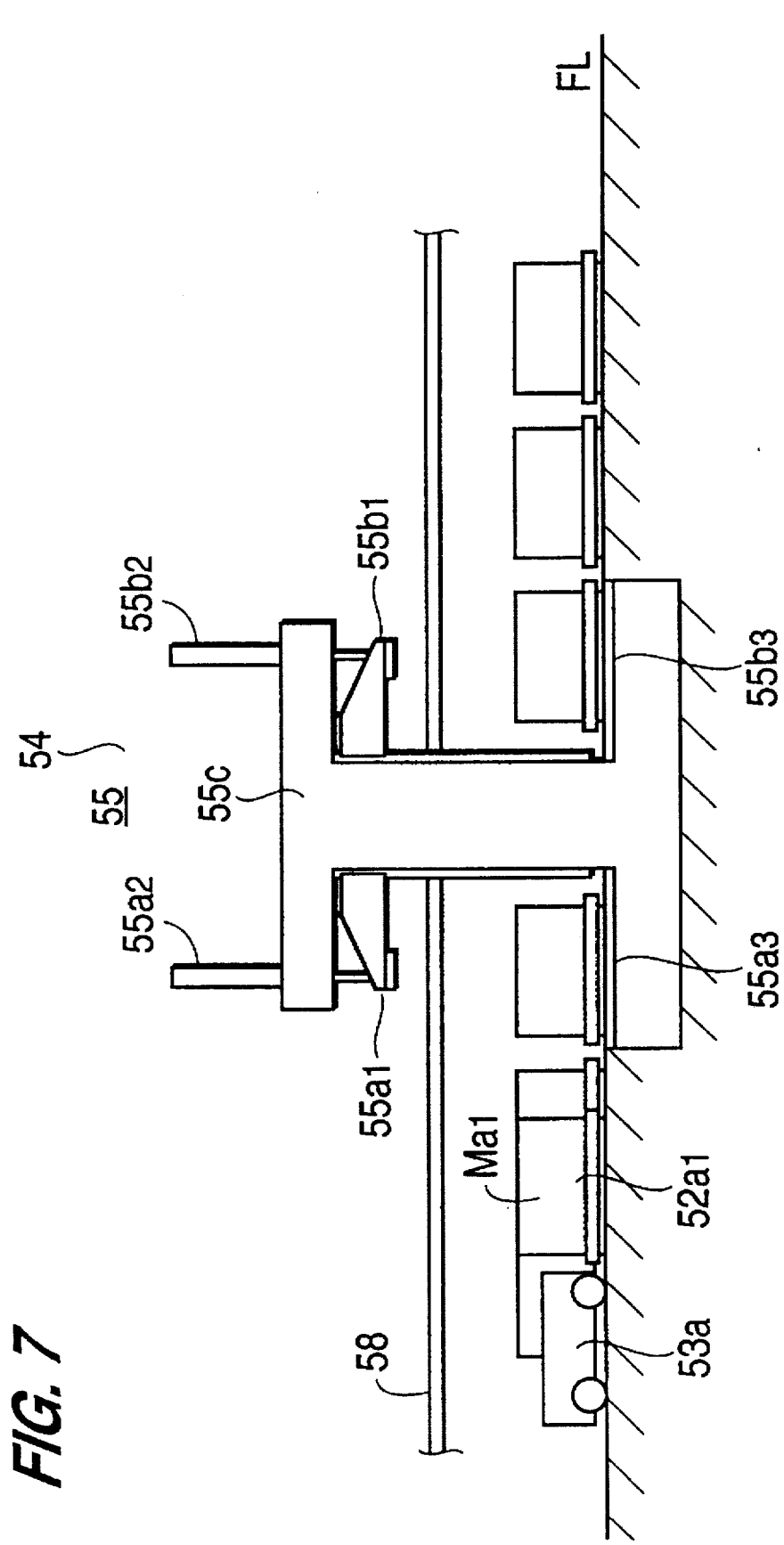
FIG. 7 is a vertical cross-sectional side view showing the tire mold transporter taken along a line b—b in FIG. 6.
Figure 8:
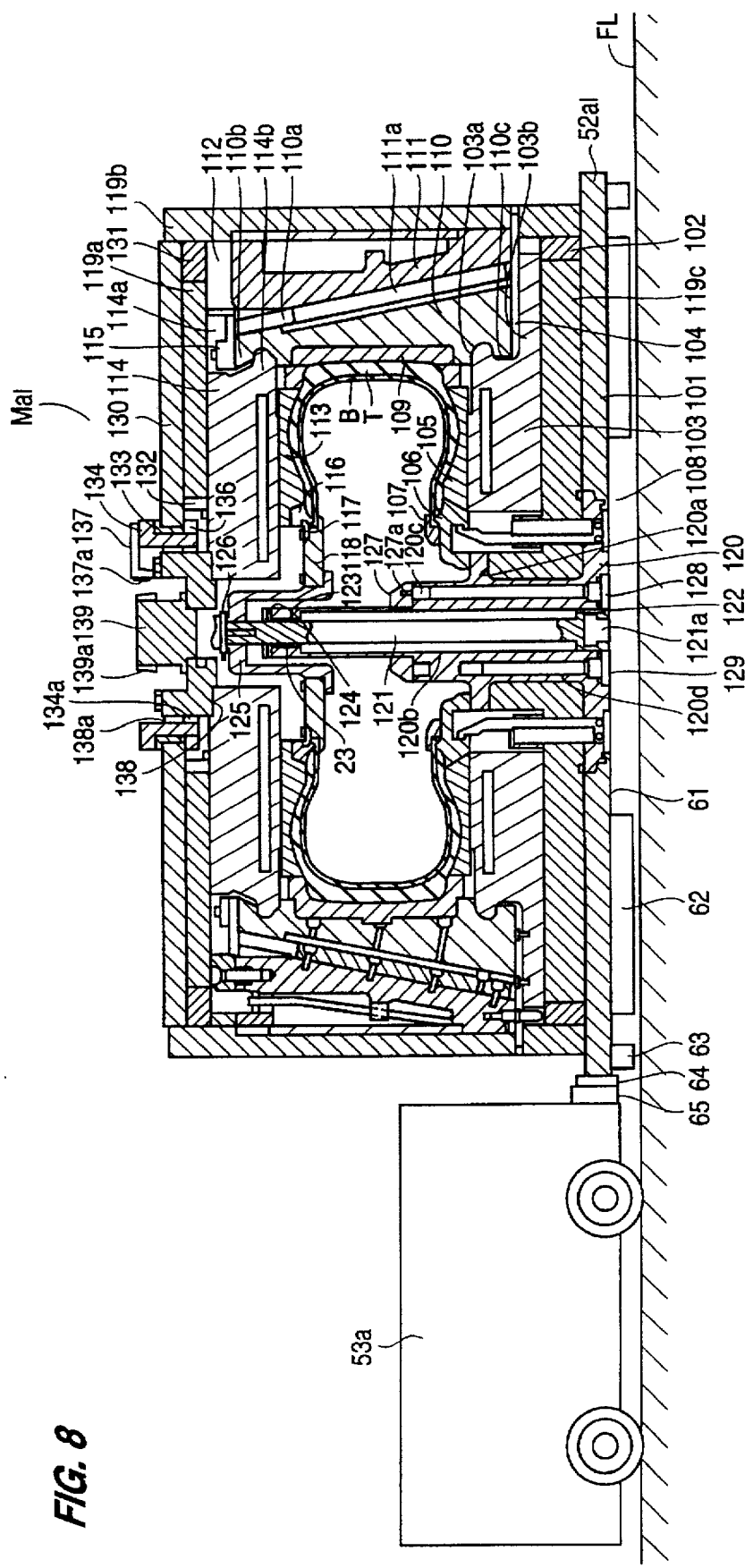
FIG. 8 is a vertical cross-sectional side view showing the tire mold transporter taken along a line c—c in FIG. 6.

Subsequently, a description will be given of a tire mold transporter in accordance with a third embodiment of the present invention with reference to FIGS. 6 to 8.

Vulcanizing stations 51 (a vulcanizing station 51a for a group a and a vulcanizing station 51b for a group b) are comprised of a plurality of mold stationary tables 51 (51$a_1$ to 51$a_7$, 51$b_1$ to 51$b_7$) which receive a plurality of tire vulcanizing molds M (Ma$_1$ to Ma$_7$, Mb$_1$ to Mb$_7$) therein, respectively. Each of the vulcanizing stations 51 is equipped, as the occasion demands, with heated and pressurized medium supplement means, a piping or the like.

It should be noted that, the third embodiment is of the type in which the tire vulcanizing molds M are received in the mold tables in a state where the tire vulcanizing molds M are mounted on trucks 52 (52$a_1$ to 52$a_7$, 52$b_1$ to 52$b_7$) which will be described in more detail; however, in the case where it is of the type in which the tire mold M is transferred from the truck 52 onto the mold stationary table 51, mold transfer means (for example, a roller conveyor and a cylinder drive pusher) is attached to the tire mold transporter.

Mold opening/closing stations 54 are comprised of mold opening/closing units 55 as in a known tire vulcanizer, known unloader 56 (56a, 56b) which take out vulcanized tires from the tire molds M, and known loaders 57 (57a, 57b) which insert unvulcanized tires in the tire molds M. As the occasion demands, the mold opening/closing stations 54 are equipped with a vulcanized tire transportation conveyor 58, and an unvulcanized tire transportation conveyor 59.

Figure 9:
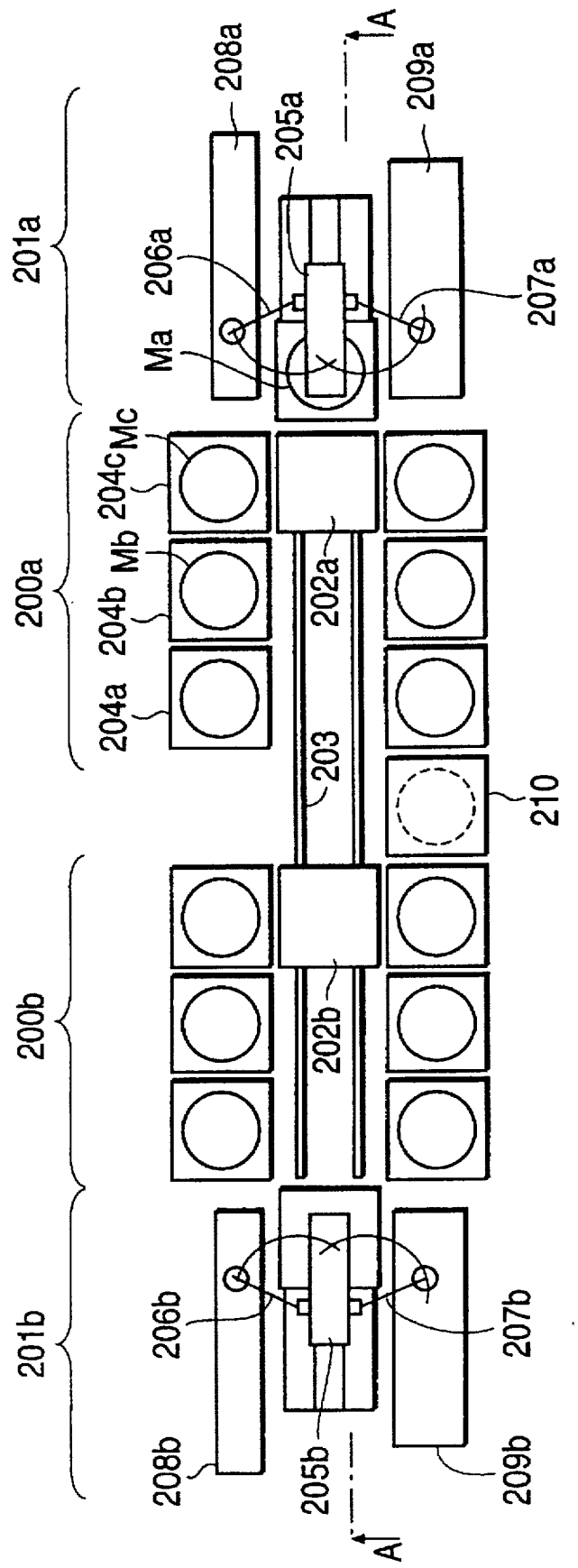
FIG. 9 is a plan view showing a tire vulcanizer which has already been proposed by the present applicant.
Figure 10:
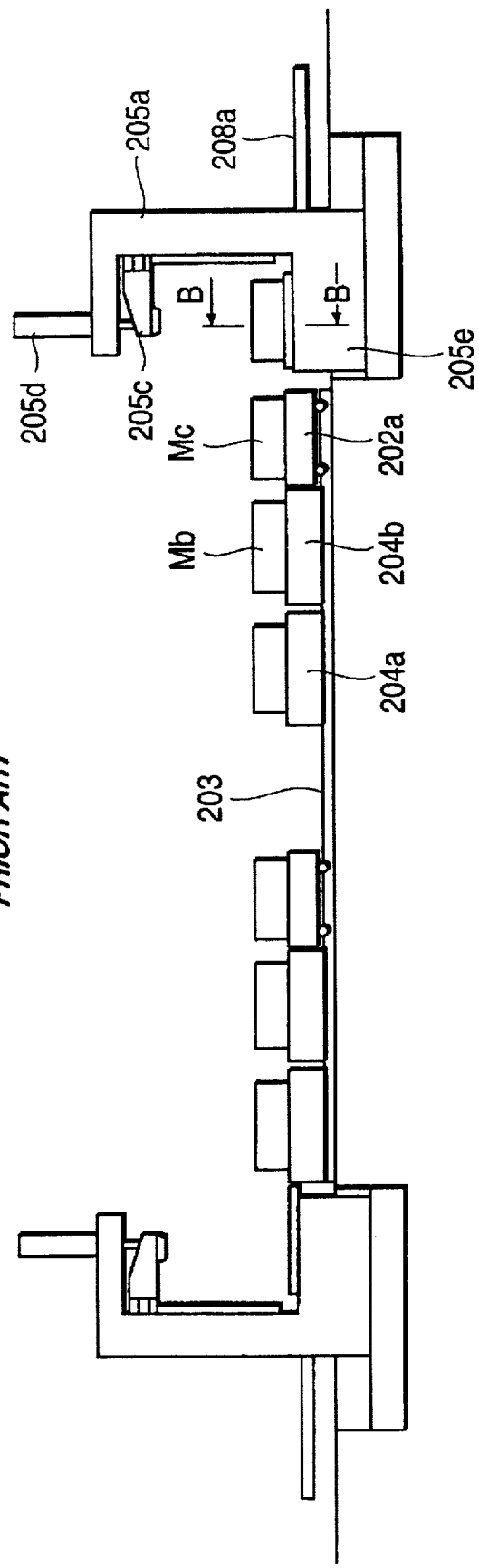
FIG. 10 is a vertical cross-sectional side view showing the tire vulcanizer taken along a line A—A in FIG. 9.
Figure 11:
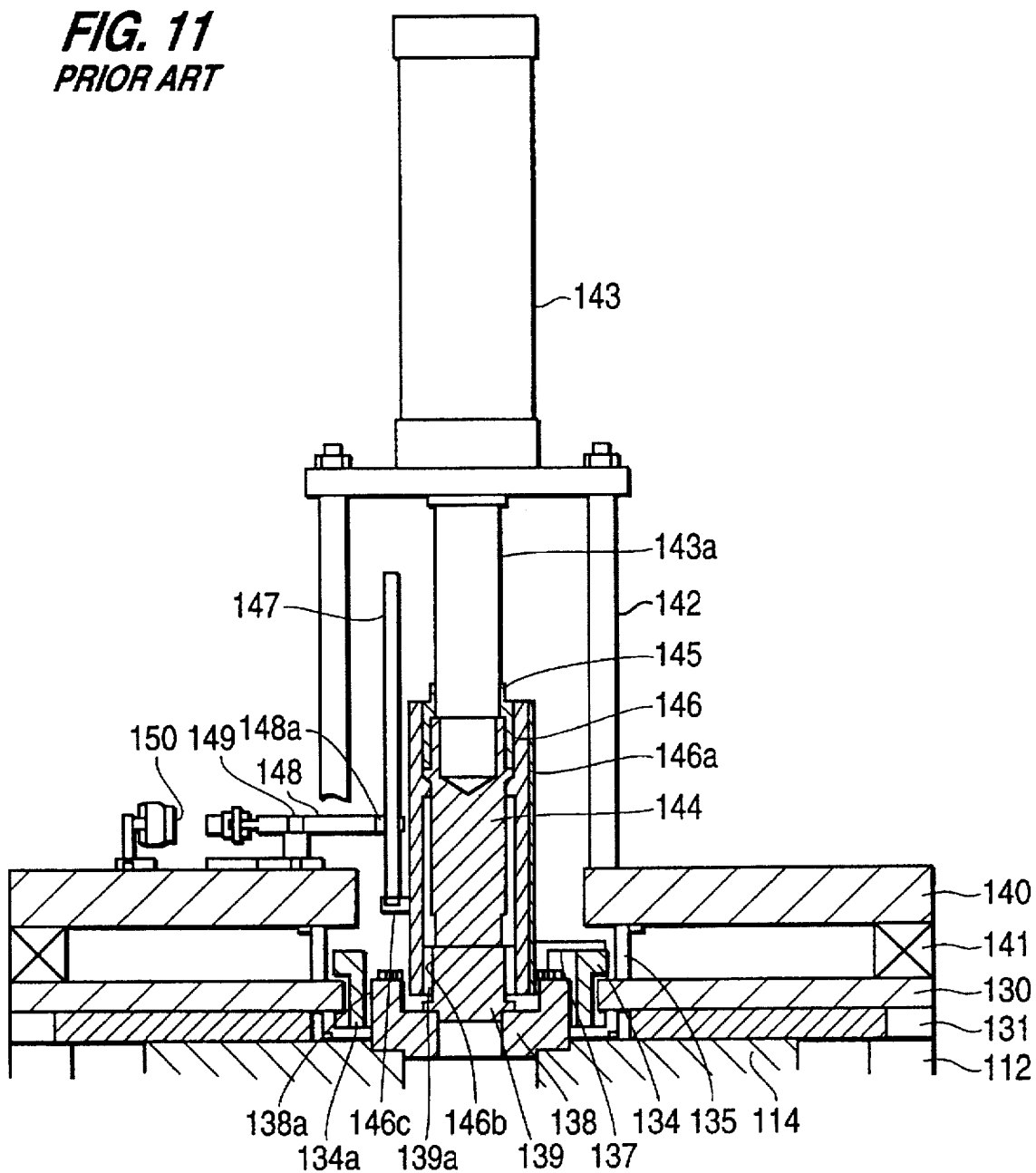
FIG. 11 is a vertical cross-sectional front view showing one embodiment of a tire vulcanizing split mold unit and a mold opening/closing unit in the tire vulcanizer, taken along a line B—B in FIG. 10.
Figure 12:
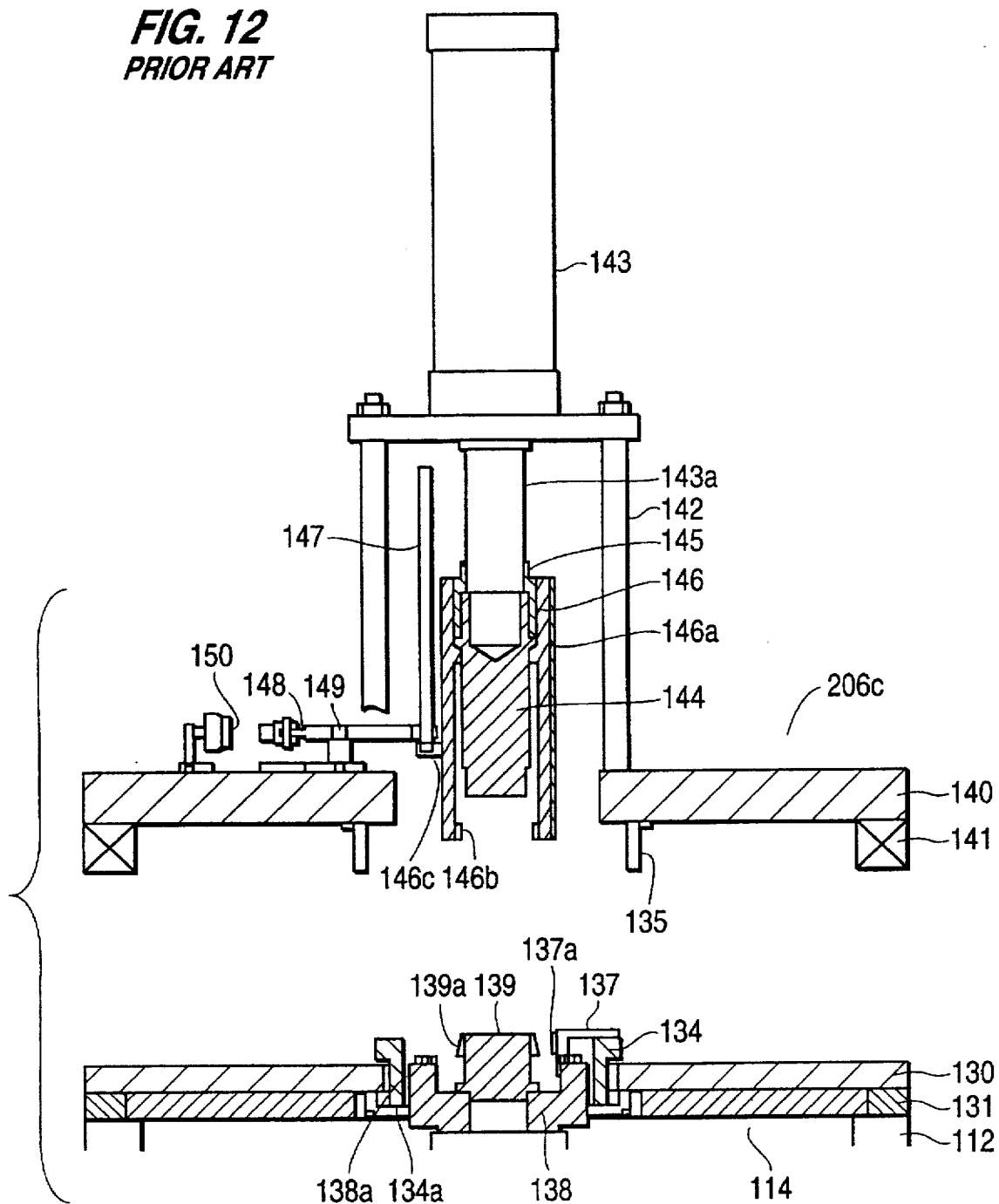
FIG. 12 is a vertical cross-sectional front view showing another embodiment of the tire vulcanizing split mold unit and the mold opening/closing unit in the tire vulcanizer, taken along a line B—B in FIG. 10.

It should be noted that the mold opening/closing unit 55 of the third embodiment is constituted so that the two mold opening/closing units 205 (205a, 205b) shown in FIG. 9 are joined together back to back. The reference numerals 55$a_1$ and 55$b_1$ of the mold opening/closing unit 55 denote elevation cylinders which are fixed to beams of arms 55$a_2$ and 55$b_2$, which are assembled in the support portion 55c so as to go up and down, extending from a support portion 55c. The top portions of the rods of the elevation cylinders 55$a_2$ and 55$b_2$ are fixed onto the above-mentioned arms 55$a_1$ and 55$b_1$, and the elevation cylinders 55$a_2$ and 55$b_2$ are actuated so that the arms 55$a_1$ and 55$b_1$ go up and down (reference numerals 55$a_1$, 55$a_2$ and 55$a_3$ correspond to 205c, 205d and 205e in FIG. 10, respectively).

The tire mold transportation unit in accordance with the third embodiment is comprised of trucks 52 (52$a_1$ to 52$a_7$, 52$b_1$ to 52$b_7$) on which the respective tire molds M are mounted, and carrier cars 53 (a carrier car 53a for a group a, a carrier car 53b for a group b, and a spare delivery car 53c for a group c not shown). Each of the trucks 52 is comprised of a truck body 61 integrated with the substrate 101 of the above-mentioned tire mold M, a plurality of legs 63 and a plurality of air sliders 62 both of which are fixed onto the lower surface of the truck body 61, and a piping (not shown) through which a compressed air is supplied to the air slider 62, as shown in FIG. 8.

Figure 13:
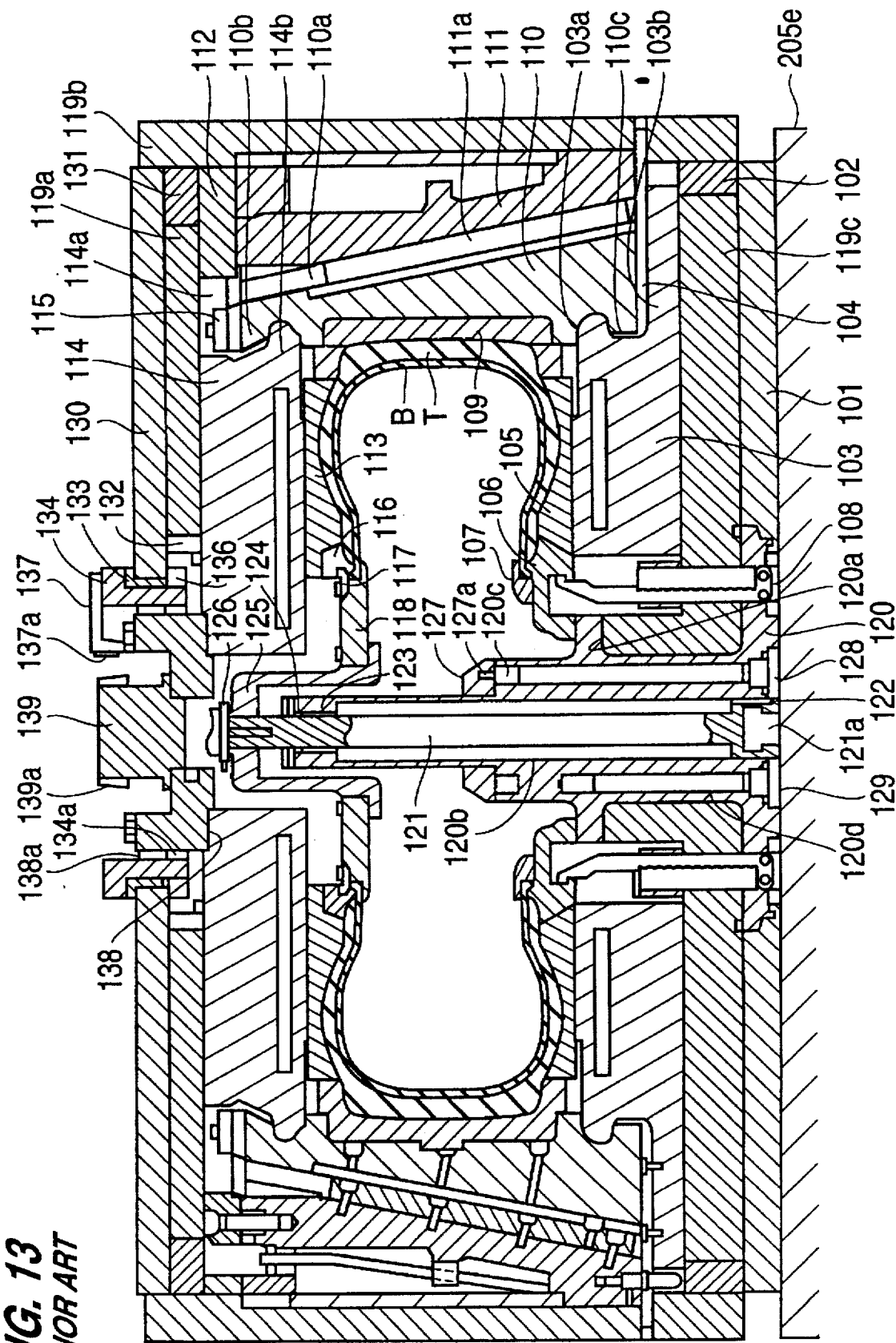
FIG. 13 is a vertical cross-sectional side view showing a conventional tire vulcanizing mold.

It should be noted that the tire mold M is entirely the same as the tire mold M shown in FIG. 13 in structure except that it is assembled on the upper surface of the truck 61 instead of the above-mentioned substrate 101. Therefore, the detailed description of the tire mold M shown in FIG. 8 will be omitted.

The above-mentioned carrier car 53 is of a known self-drive truck of the type which follows a conductor embedded in a floor surface FL, and the frame of the carrier car 53 is coupled to the truck body 61 through a guide member 65 and a truck coupling electromagnet 64 so as to go up and down. It should be noted that such a coupling is made so as not to lead to a problem even though a relative level between the carrier car 53 and the truck body 61 fluctuates.

The above-mentioned carrier car 53 is equipped with a compressed air supply source (not shown) such as a blower for supplying a compressed air to the air slider 62, and a piping (not shown) coupled to a compressed air supply inlet of the truck 52.

Subsequently, a description will be given in more detail of the operation of the tire mold transporter (the third embodiment) shown in FIGS. 6 to 8.

In the vulcanizing station 51, the lower surface of the plural legs 63 of the truck 52 is abutted against the upper surface of the mold stationary table 51 to support the tire mold M where vulcanization is being conducted, which is mounted on the truck 52.

It is assumed that the vulcanization of a tire has been finished within the tire mold Ma$_1$. Then, the carrier car 53a is moved in front of the truck 52$a_1$, and the carrier car 53a and the truck 52$a_1$ are coupled to each other with electric power being applied to the truck coupling electromagnet 64. Then, the blower is started in such a manner that compressed air is supplied to the plural air sliders 62 of the truck 52$a_1$, and an air is blown out from a gap between the air slider 62 and the floor surface. As a result, the truck 52$a_1$ floats up slightly so that the truck 52$a$1 comes out of contact with the floor surface.

In such a state, the truck 52$a_1$ on which the tire mold Ma$_1$ is mounted is moved to the a-group side within the mold opening/closing unit 55, that is, onto the base plate 55$a_3$ by means of the carrier car 53a.

Upon the arrival of the truck 52$a_1$ onto the base plate 55$a_3$, the carrier car 53a slightly moves in such a manner that the tire mold Ma$_1$ and the base plate 55$a_3$ are centered. In this situation, as the occasion demands, a centering unit (not shown) supplements such a centering operation.

Thereafter, the blower is stopped so that the legs 63 of the truck 52$a_1$ abut against the upper surface of the base plate 55$a_3$ and are stationarily placed.

Then, the tire mold Ma$_1$ is opened in the same manner as the conventional one so that the vulcanized tire is removed therefrom. Thereafter, an unvulcanized tire to be succeedingly vulcanized is inserted in the mold and shaped before the tire mold Ma$_1$ is closed. Subsequently, the tire mold Ma$_1$ is returned to the predetermined position 51$a_1$ within the vulcanizing station 51 in the above-mentioned manner.

During the above-mentioned work, in the case where one of devices constituting a group has failed, if a failure occurs in the carrier car 53a, the coupling to the truck 52$a_1$ is released, and the spare carrier car 53c comes into service. The failed carrier car 53a is pushed or attracted so that a passage is ensured. Then, the spare carrier car 53c is coupled to the truck 52$a_1$ so that the above-mentioned work can be continued.

Also, in the case where a failure occurs in the unloader 56a, the loader 57a or the group a of other mold opening/closing unit 55, the tire mold M is transferred to the tire opening/closing unit of another group, and processed while the failure is repaired.

In the above-mentioned mold transporter, after one of a plurality of tire molds M within the vulcanizing station 1 has completed the vulcanization operation, the empty truck 19 is moved in front of the tire mold M (the second position P2), and as the occasion demands, the second railway 12 is turned. Then, the mold movement drive unit of the tire mold transfer unit 32 is moved in a direction, which it is away from the center of the truck 19. After the completion of vulcanization, the beam 38 of the drive unit is moved so that the block 41 is inserted toward the lower portion of the tire mold M, and then moved toward the center side of the truck 19 so that a projection provided on the lower surface of the tire mold M is engaged with a notch provided in the block 41. Thus, the truck 19 and the tire mold M are coupled to each other. Then, the beam 38 is moved in the reverse direction so that the tire mold M is moved from the third railway 13 to the second railway 12. In this situation, the tire mold M is supported by the weight receiving exclusive railways 4b, 12a and 13a and the direction guide exclusive railways 4a, 12b and 13b and transferred to the center of the truck 19. After the completion of transfer of the tire mold M, the truck 19 on which the tire mold M is mounted is moved to the first position P1, and then the tire mold M is allowed to float so that the tire mold M is positioned with respect to the mold opening/closing unit. Subsequently, the vulcanized tire is taken out from the mold, and when an unvulcanized tire is inserted in the mold and shaped, a shaping reaction or the like is prevented from directly effecting the respective railways. Then, the vulcanized tire is taken out, and the take-in and shaping of the unvulcanized tire are completed. Subsequently, after the tire mold M is closed, the heated and pressurized medium for vulcanization is introduced into the interior of the tire, thus advancing to the next vulcanizing process. The tire mold M thus proceeding to the vulcanizing process is transported to a predetermined position within the vulcanizing station 1 in a procedure reverse to the above-mentioned procedure, and the vulcanizing process is continued. The truck unit 19 moves for the purpose of transporting a tire mold in which the vulcanizing process is to be succeedingly finished.

It should be noted that in the case of conducting the exchange of the molds, the exchange of the bladders or the like, the tire mold is closed once without an unvulcanized tire being inserted in the mold, and the truck 19 transfers the tire mold to the mold exchange station. After the exchange of the molds or the like is conducted, the tire mold is transferred to the mold opening/closing station 2 to conduct the operation of inserting an unvulcanized tire to be succeedingly vulcanized in the tire mold, or the like. In this way, the tire mold M which is a weight substance is selectively, effectively and safely transported between the vulcanizing station 1 in which plural sets of tire molds are arranged to perform vulcanization and the mold opening/closing station 2 in which the tire mold is opened and the vulcanized tire is taken out from the tire mold, and subsequently an unvulcanized tire to be vulcanized is inserted into the the tire mold and shaped before the tire mold is closed.

Also, the vulcanizing station 1 can cope with a case in which the mold tables on which the tire molds M which are being vulcanized are located on both sides of a passage for the truck 19. Further, it can readily cope with a case in which a small number of mold tables are located initially, but the number of mold tables is then increased.

Also, in the above-mentioned tire mold transporter, in the vulcanizing station 51, the carrier car 53 is moved in front of the tire mold M where vulcanization has been finished, and the carrier car is coupled to the truck 52 on which the tire mold M is mounted. Simultaneously, the compressed-air supply source at the carrier car 53 side is coupled to the air slider 62 on the lower surface of the truck 52 through a piping so that air is blown from the air slider 62 and allows the truck 52 to float. In this state, the carrier car 53 takes the truck 52 at a predetermined position within the mold opening/closing unit 55. Then, the air floating is stopped so that the truck 52 is stationarily placed. Subsequently, the vulcanized tire is taken out from the tire mold M, and an unvulcanized tire to be succeedingly vulcanized is inserted in the mold and shaped before the tire mold M is closed. Then, the truck 52 is allowed to again float by air so that the carrier car 53 is returned to the original position of the vulcanizing station 51 by the carrier car 53. Then, the air floating is stopped in such a manner that the coupling of the carrier car 53 to the truck 52 is released, and the vulcanization by the tire mold M which has been returned to the original position is continued. Then, the carrier car 53 which is released from coupling to the truck 52 is moved in front of tire mold M to be succeedingly transported, and then the same work as the above-mentioned work is repeatedly performed. Also, when the carrier car 53 fails or is subjected to a periodic inspection or the like, a spare carrier car can be used. Furthermore, when the mold opening/closing unit fails or is subjected to a periodic inspection, the carrier car is transported onto a mold opening/closing unit which belongs to another group or a supplement mold opening/closing unit, and the above-mentioned operation is repeated. Accordingly, reduced productivity when the mold opening/closing unit or the like fails can be lowered to the required minimum.

Furthermore, the tire mold transporter is divided into the truck 52 and the carrier car 53, whereas the tire mold assembling substrate 101 is used as the truck 52. Hence, the costs can be reduced, and reducing the costs as well as the generation rate of failures of the tire mold transporter can be reduced with the reduction of the number of the parts.

The foregoing description of a preferred embodiment of the present invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A tire mold transporter for shuttling between a vulcanizing station in which plural sets of tire molds are arranged to perform vulcanization and a mold opening/closing station in which a tire mold is opened and a vulcanized tire contained therein is removed from the tire mold, subsequently an unvulcanized tire is inserted into the tire mold, and then the tire mold is closed, said tire mold transporter comprising:

a first railway disposed along said vulcanizing station and said mold opening/closing station;

a truck having a drive unit, said truck being moveable on said first railway between a first position in the mold opening/closing station and a plurality of second positions along a front area of the vulcanizing station;

a second railway, disposed on said truck, extending in a direction which is orthogonal to said first railway;

a plurality of third railways disposed at said plurality of second positions, respectively, each of said third railways extending in a direction which is orthogonal to said first railway and being connectable to said second railway; and a mold transfer drive unit fixed on said truck such that when one of said third railways and said second railway on said truck are connected to each other, said mold transfer drive unit is operable to move a tire mold from said second railway onto one of said third railways and from one of said third railways onto said second railway.

2. The tire mold transporter as claimed in claim 1, wherein said mold transfer drive unit comprises:
   a first mold transfer unit for moving tire molds to and from one side of said first railway; and
   a second mold transfer unit for moving tire molds to and from the other side of said first railway.

3. The tire mold transporter as claimed in claim 2, further comprising:
   a first moving means, disposed on said first railway, for elevating said truck from said first railway when said truck is located at said first position;
   a second moving, means, disposed on an upper surface of said truck for elevating a tire mold on said truck from said second railway.

4. The tire mold transporter as claimed in claim 3, wherein:
   said first moving means comprises a plurality of hydraulic cylinders and a plurality of positioning rods; and
   said second moving means comprises a plurality of hydraulic cylinders and a plurality of positioning rods.

5. The tire mold transporter as claimed in claim 4, wherein said tire mold transfer drive unit includes:
   a fourth railway disposed on said truck and extending in a direction orthogonal to said second railway;
   a slider movable on said fourth railway;
   a fifth railway supported on said slider and extending in parallel to said second railway;
   a beam movable on said fifth railway and having first and second ends;
   a sixth railway fixed on said beam and extending in parallel to said fifth railway;
   a block movable on said sixth railway;
   a chain wheel rotatably attached to said first and second ends of said beam; and
   a chain engaged with said chain wheel and connected to said block and said slider.

6. The tire mold transporter as claimed in claim 2, wherein said tire mold transfer drive unit includes:
   a fourth railway disposed on said truck and extending in a direction orthogonal to said second railway;
   a slider movable on said fourth railway;
   a fifth railway supported on said slider and extending in parallel to said second railway;
   a beam movable on said fifth railway and having first and second ends;
   a sixth railway fixed on said beam and extending in parallel to said fifth railway;
   a block movable on said sixth railway;
   a chain wheel rotatably attached to said first and second ends of said beam; and
   a chain engaged with said chain wheel and connected to said block and said slider.

7. The tire mold transporter as claimed in claim 2, wherein said first railway, said second railway, and said third railways each comprise a pair of load-bearing rails and a direction guide railway, and said direction guide railway is disposed so as to pass a center point of a tire mold positioned on said load-bearing rails.

8. The tire mold transporter as claimed in claim 1, wherein said truck is mounted so that said second railway and said mold transfer drive unit are rotatable through 180 degrees on a horizontal plane.

9. The tire mold transporter as claimed in claim 8, further comprising:
   a first moving means, disposed on said first railway, for elevating said truck from said first railway when said truck is located at said first position;
   a second moving means, disposed on an upper surface of said truck for elevating a tire mold on said truck from said second railway.

10. The tire mold transporter as claimed in claim 9, wherein:
    said first moving means comprises a plurality of hydraulic cylinders and a plurality of positioning rods; and
    said second moving means comprises a plurality of hydraulic cylinders and a plurality of positioning rods.

11. The tire mold transporter as claimed in claim 9, wherein said tire mold transfer drive unit includes:
    a fourth railway disposed on said truck and extending in a direction orthogonal to said second railway;
    a slider movable on said fourth railway;
    a fifth railway supported on said slider and extending in parallel to said second railway;
    a beam movable on said fifth railway and having first and second ends;
    a sixth railway fixed on said beam and extending in parallel to said fifth railway;
    a block movable on said sixth railway;
    a chain wheel rotatably attached to said first and second ends of said beam; and
    a chain engaged with said chain wheel and connected to said block and said slider.

12. The tire mold transporter as claimed in claim 8, wherein said first railway, said second railway, and said third railways each comprise a pair of load-bearing rails and a direction guide railway, and said direction guide railway is disposed so as to pass a center point of a tire mold positioned on said load-bearing rails.

13. The tire mold transporter as claimed in claim 1, further comprising:
    a first moving means, disposed on said first railway, for elevating said truck from said first railway when said truck is located at said first position;
    a second moving means, disposed on an upper surface of said truck for elevating a tire mold on said truck from said second railway.

14. The tire mold transporter as claimed in claim 13, wherein:
    said first moving means comprises a plurality of hydraulic cylinders and a plurality of positioning rods; and
    said second moving means comprises a plurality of hydraulic cylinders and a plurality of positioning rods.

15. The tire mold transporter as claimed in claim 13, wherein said tire mold transfer drive unit includes:
    a fourth railway disposed on said truck and extending in a direction orthogonal to said second railway;

a slider movable on said fourth railway;

a fifth railway supported on said slider and extending in parallel to said second railway;

a beam movable on said fifth railway and having first and second ends;

a sixth railway fixed on said beam and extending in parallel to said fifth railway;

a block movable on said sixth railway;

a chain wheel rotatably attached to said first and second ends of said beam; and a chain engaged with said chain wheel and connected to said block and said slider.

16. The tire mold transporter as claimed in claim 1, wherein said tire mold transfer drive unit includes:

a fourth railway disposed on said truck and extending in a direction orthogonal to said second railway;

a slider movable on said fourth railway;

a fifth railway supported on said slider and extending in parallel to said second railway;

a beam movable on said fifth railway and having first and second ends;

a sixth railway fixed on said beam and extending in parallel to said fifth railway;

a block movable on said sixth railway;

a chain wheel rotatably attached to said first and second ends of said beam; and a chain engaged with said chain wheel and connected to said block and said slider.

17. The tire mold transporter as claimed in claim 1, wherein said first railway, said second railway, and said third railways each comprise a pair of load-bearing rails and a direction guide railway, and said direction guide railway is disposed so as to pass a center point of a tire mold positioned on said load-bearing rails.

* * * * *